United States Patent
Anderson

(10) Patent No.: US 11,800,355 B2
(45) Date of Patent: Oct. 24, 2023

(54) SECURE WIRELESS DISCOVERY AND PAIRING

(71) Applicant: NCR Corporation, Atlanta, GA (US)

(72) Inventor: Andrew Thomas Anderson, Kingsmuir (GB)

(73) Assignee: NCR Corporation, Atlanta, GA (US)

( * ) Notice: Subject to any disclaimer, the term of this patent is extended or adjusted under 35 U.S.C. 154(b) by 327 days.

(21) Appl. No.: 17/184,703

(22) Filed: Feb. 25, 2021

(65) Prior Publication Data

US 2022/0272536 A1 Aug. 25, 2022

(51) Int. Cl.
| | |
|---|---|
| H04W 12/06 | (2021.01) |
| H04W 12/61 | (2021.01) |
| H04W 12/08 | (2021.01) |
| H04W 12/062 | (2021.01) |
| H04W 12/041 | (2021.01) |
| G06K 7/10 | (2006.01) |
| G06K 7/14 | (2006.01) |
| G06K 19/06 | (2006.01) |

(Continued)

(52) U.S. Cl.
CPC ........ *H04W 12/068* (2021.01); *G06K 7/1095* (2013.01); *G06K 7/1417* (2013.01); *G06K 19/06037* (2013.01); *G06K 19/06112* (2013.01); *G06Q 20/105* (2013.01); *G06Q 20/1085* (2013.01); *G06Q 20/3224* (2013.01); *G06Q 20/40155* (2020.05); *H04W 12/041* (2021.01); *H04W 12/062* (2021.01); *H04W 12/08* (2013.01); *H04W 12/50* (2021.01); *H04W 12/61* (2021.01); *G06Q 20/3226* (2013.01)

(58) Field of Classification Search
CPC ... H04W 12/068; H04W 12/61; H04W 12/08; H04W 12/062; H04W 12/041; H04W 12/50; G06K 7/1095; G06K 7/1417; G06K 19/06037; G06K 19/06112; G06Q 20/3224; G06Q 20/105; G06Q 20/1085; G06Q 20/40155
USPC .......................................................... 726/7
See application file for complete search history.

(56) References Cited

U.S. PATENT DOCUMENTS

| | | | | |
|---|---|---|---|---|
| 10,657,242 B1 * | 5/2020 | Xia | ........................ | H04L 9/0825 |
| 11,328,275 B1 * | 5/2022 | Goetz | ................. | G07D 11/0087 |

(Continued)

*Primary Examiner* — Samson B Lemma
(74) *Attorney, Agent, or Firm* — Schwegman Lundberg & Woessner, P.A.

(57) ABSTRACT

A terminal selectively and passively monitors for predefined wireless network discovery advertisements/requests. Requests that match what are expected by the terminal or requests that are in a predefined format are verified. The requests lack any connection pairing passcode; rather, the passcodes are separately provided from connecting devices only after the discovery requests are verified. The terminal independently authenticates the passcodes before authorizing wireless sessions between the devices and the terminal. Wireless discovery settings are continuously changed by the terminal and are valid for only a preset time window, each setting corresponds to a Time-based One Time Password (TOTP) representing a passcode; the TOTP is dependent on and valid only for the corresponding setting and the corresponding time window. In an embodiment, the connection requests are preauthorized by a server for a time window in the future, and the terminal authenticates the requests without interaction with the server.

16 Claims, 3 Drawing Sheets

(51) Int. Cl.
*G06Q 20/32* (2012.01)
*G06Q 20/10* (2012.01)
*G06Q 20/40* (2012.01)
*H04W 12/50* (2021.01)

(56) References Cited

U.S. PATENT DOCUMENTS

| | | | | |
|---|---|---|---|---|
| 2005/0113070 | A1* | 5/2005 | Okabe | H04W 12/068 |
| | | | | 455/410 |
| 2009/0132813 | A1* | 5/2009 | Schibuk | G06Q 20/4014 |
| | | | | 726/9 |
| 2013/0262857 | A1* | 10/2013 | Neuman | H04L 63/083 |
| | | | | 713/155 |
| 2014/0175179 | A1* | 6/2014 | Carter | G06Q 20/3224 |
| | | | | 235/494 |
| 2019/0095607 | A1* | 3/2019 | Howard | G06F 21/41 |
| 2019/0258839 | A1* | 8/2019 | Tokuchi | G06K 7/1095 |
| 2020/0233949 | A1* | 7/2020 | Xia | H04W 12/08 |
| 2020/0314091 | A1* | 10/2020 | Master | H04W 12/068 |
| 2021/0176059 | A1* | 6/2021 | Hertrich | H04L 9/3271 |

* cited by examiner

SECURE WIRELESS DISCOVERY AND PAIRING

BACKGROUND

Network connectivity is Omnipresent with the advent of wireless technologies. In fact, even the smallest of devices not typically thought to be "intelligent" now include wireless connectivity capabilities that allow such devices to become part of the Internet-of-Things (IoTs).

However, with widespread connectivity, device security has become a significant problem. Further, some types of devices require extensive security measures, such as Automated Teller Machines (ATMs).

Even with the availability of encrypted wireless technologies, enterprises who manage ATMs are reluctant to permit wireless device connections to the ATMs because of security concerns. In fact, ATMs typically comprise private secure wired network connections, which are largely not accessible to the Internet at large because of security concerns. These private secure wired network connections have largely shielded ATMs from Denial of Service (DoS) attacks, which can take an ATM offline for it intended purposes. But an ATM with wireless capabilities that is continuously monitoring a wireless channel for a connection request could expose the ATM to wireless DoS attacks and create other attack vectors for disabling or penetrating the ATM.

Moreover, attempting to manage authorized keys, whitelists, device identifiers, etc. (security information) for purposes of selectively providing secure wireless access to ATMs is problematic for a number of reasons. The security information, if centrally managed from a server, becomes a lucrative target for hackers. The ATMs typically have to be accessed onsite to include security information because of their limited and private wired network capabilities and any useful security approach requires continuous changing of the security information, such that this approach is unrealistic and impractical. Still further, employees or security personnel with access to the security information are not always honest; anyone with access to the security information poses a security risk that they will divulge the security information or utilize it themselves for nefarious purposes.

As a result, ATMs have largely not provided any significant wireless features or wireless functions, which can be utilized by support personnel and/or customers of the ATMs.

Thus, there is a need to provide secure wireless device capabilities for a device, which do not require extensive monitoring, maintenance, and oversight and which allow the device to change its own security information without requiring updates from a centralized server and without requiring a manual in-person update to the device.

SUMMARY

In various embodiments, methods and a system for secure wireless discovery and pairing are presented.

According to an embodiment, a method for secure wireless discovery and pairing is presented.

DETAILED DESCRIPTION

Figure 1:
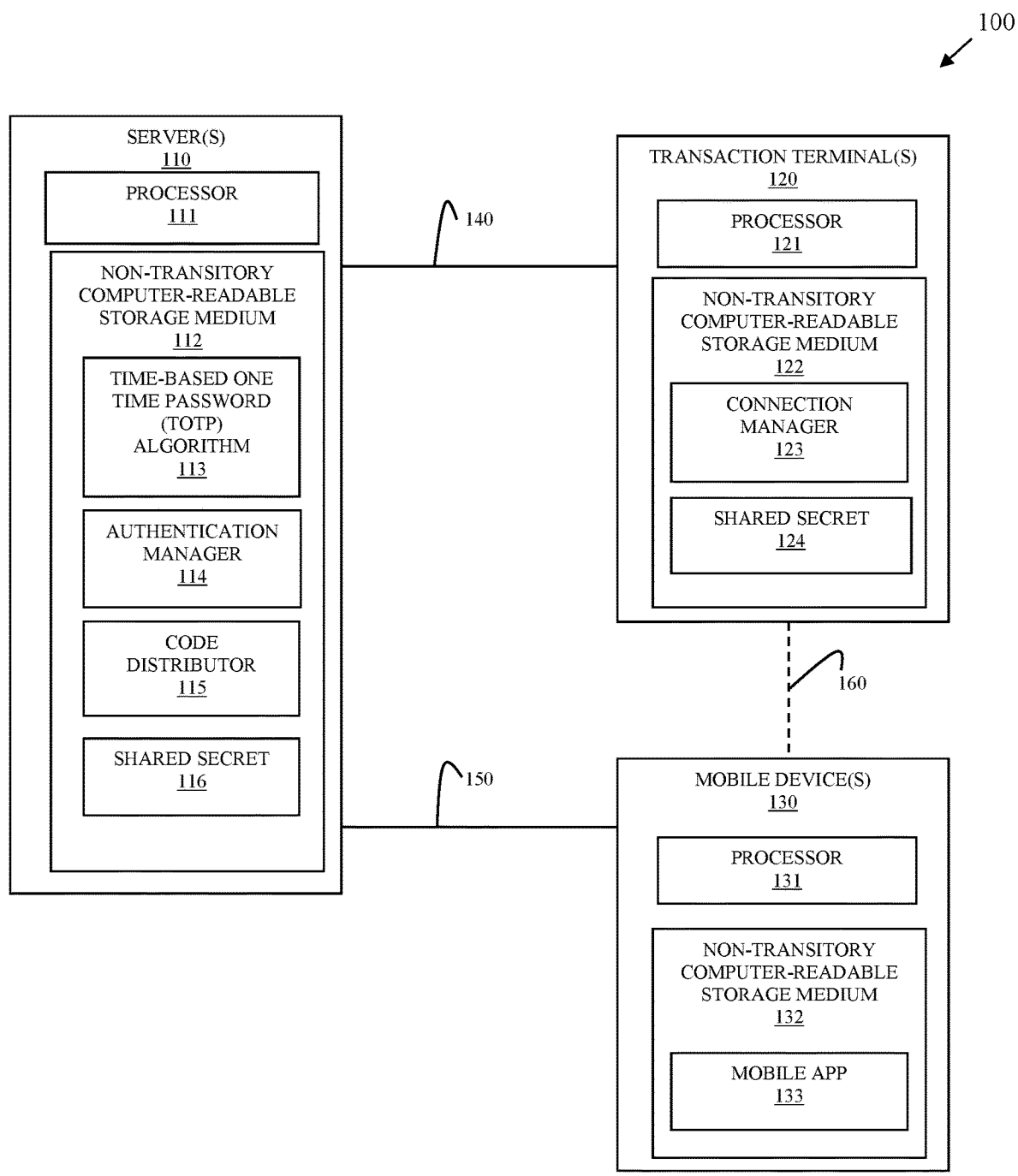
FIG. 1 is a diagram of a system for secure wireless discovery and pairing, according to an example embodiment.

FIG. 1 is a diagram of a system 100 for secure wireless discovery and pairing between two devices, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of secure wireless discovery and pairing between two devices, presented herein and below.

As will be illustrated and discussed more completely herein and below, system 100 provides a secure mechanism by which a transaction terminal performs discovery or looks for wireless connection requests and a secure mechanism by which a pairing passcode is generated and changed. Discovery of a device to connect with by the terminal, is selective and in some cases can be dynamically changed and generated by the terminal. Similarly, the pairing code to complete a connection can be dynamically changed and, in some cases, generated by the terminal. The connecting device may be required to provide a proper discovery code and a proper pairing code, which the terminal independently verifies before a connection is permitted.

Furthermore, system 100 ensures that each successful connection: is limited to a specific time and specific purpose/function; is established and authorized ahead of a scheduled connection time; does not require a user of a connecting device to enter any keys/passcodes manually from their device; permits out-of-band key pairing; permits self-management by the terminal; and provides prior authorization to a connecting device for access to the terminal without the connecting device or user requiring access to the terminal for the prior authorization and without the terminal being required to be preconfigured to preauthorize the connecting device or the user.

System 100 also provides a secure mechanism by which users can establish secure private audio with the terminal and secure private transaction capabilities with the terminal.

System 100 comprises a cloud/server 110, transaction terminals 120, and a plurality of user-operated mobile devices 130.

Cloud/server 110 comprises a processor and a non-transitory computer-readable storage medium 112. Medium 112 comprises executable instructions for a Time-based One Time Password (TOTP) algorithm 113, an authentication manager 114, and a code distributor 115. When the executable instructions are executed by processor 111, this causes processor 111 to perform operations discussed herein and below with respect to 113-115. Medium 112 also comprises a shared secrete 116 that is shared with terminal 120. Each shared secret 116 is specific to and unique to a given terminal 120. In an embodiment, shared secret 116 is 20 bytes in size.

Transaction terminal 120 comprises at least one processor 121 and a non-transitory computer-readable storage medium 122. Medium 122 comprises executable instructions for connection manager 123. When the executable instructions are executed by processor 121, this causes processor 121 to perform operations discussed herein and below with respect to connection manager 123. Medium 122 also comprises a shared secrete 124 (shared secrete 124 corresponds to shared secrete 116 held by cloud/server 110 for terminal 120). It is noted that the executable instructions of medium 122 also comprises a same version of the TOTP algorithm 113, which is processed by connection manager 123.

Each mobile device 130 comprises a processor 131 and a non-transitory computer-readable storage medium 132. Medium 132 comprises executable instructions for a mobile application (app) 133.

As used herein a "user" is referred to as an operator of mobile device 130 and can be a customer desiring to wirelessly connect to terminal 120 for a transaction or a customer/service engineer desiring to wirelessly connect to terminal 120 for some diagnostic, support, and/or maintenance operation on terminal 120.

System 100 provides a two secure wireless connection capabilities.

In a first capability, connection manager 123 is preconfigured to periodically and/or randomly change its wireless discovery settings and its corresponding pairing code using its shared secret 124 and its TOTP algorithm. Any connection advertisement not matching the terminal's current discovery settings is ignored. Any accepted connection advertisement must also provide a matching pairing code that connection manager 123 also computes using its shared secret and its TOTP algorithm.

In a second capability, connection manager 123 is configured to passively monitor discover advertisements for device connections and to accept only those connection advertisements matching a preconfigured format and having preconfigured settings verified by the connection manager 123 using its shared secret 124 and its TOTP algorithm. Also, in the second capability, only a pairing code that also matches a computed pairing code that is computed by connection manager 123 will permit a successful connection to terminal 120.

Each of these capabilities will now be discussed in greater detail.

First Secure Connection Embodiment

In this embodiment, cloud/server 110 is optional. That is, the shared secret 124 does not have to be shared and can be privately maintained on terminal 120. However, in some embodiments of the first secure connection embodiment, shared secret 124 may be shared with the shared secret 116 of cloud/server 110 (as will be discussed below).

Connection manager 123 utilizes a TOTP algorithm hashes shared secret 124 with a down-sampled version of a desired access time for wireless access to terminal 120. The access time can be preconfigured to last for a specific duration (time window size), e.g., 5 minutes, etc.

The connecting mobile device 130 does not have access to and does not ever acquire the shared secret 124 of terminal 120. Connection manager 123 only provides a computed TOTP to app 133. The TOTP is only valid for the current time window (or perhaps valid for one prior computed time window that precedes a current time window). Once the time window expires, the provided TOTP is of no value to the app 133 and mobile device 130 cannot connect with terminal 120.

Additionally, connection manager 123 provides discovery or connection settings to app 133, app 133 must provide these discovery/connection settings correctly back to connection manager 123 with a valid TOTP in order for connection manager 123 to authorize a connection and a session for the time window with terminal 120.

A process flow for a valid mobile device obtaining a secure wireless connection to terminal 120 proceeds as follows. App 133 obtains the discovery connection settings and a valid TOTP computed by connection manager 123 for a current time window. App 133 issues a pairing request (connection advertisement) using the discovering/connection settings. When a wireless transceiver on the mobile device 130 attempts to popup a window on a display of the mobile device 130 for user entry of a pairing code, app 133 intercepts the request and provides the TOTP. This is done automatically, such that the user never sees the popup window request for entry of the TOTP. The user never knows what the TOTP was and does not have access to it through app 133.

Connection manager 123 independently recomputes the TOTP using the current time window or a last-provided time window and the shared secret 124. The app automatically supplied TOTP is then compared against the newly computed TOTPs (one for the current time window and one for the last-provided time window). Assuming, one of the two computed TOTPs match the app-supplied TOTP, connection manager 123 permits device 130 to wirelessly connect in a session with terminal 120. The connection and session are authorized or authenticated.

The manner in which app 133 obtains the TOTP can occur in numerous manners. For example, connection manager 123 may display a Quick Response (QR) code on a splash screen of the terminal's display, which the user obtains by capturing an image of the QR code using an integrated camera of device 130, which is accessible to app 133. App 133 decodes the QR code image and obtains the discovery/connection settings and the TOTP for the current time window.

In another embodiment, app 133 obtains the discovery/connection settings for purposes of making a correct wireless connection advertisement to terminal 120 and obtains the TOTP from server 110. Here, server 110 and terminal 120 have time synchronized clocks with one another. Authentication manager 114 generates discovery/connection settings and a TOTP for an agreed upon time window or a current time window. Authentication manager 114 uses its shared secret 116 and TOTP algorithm to generate synchronized discovery/connection settings and the TOTP for a given time window. Code distributor 115 provides the discovery/connection settings and TOTP to app 133. The app 133 provides the discovery/connection settings and TOTP to connection manager 123 when device 130 is within wireless range of providing a wireless connection advertisement, the causes an initial connection between device 130 and 120 where the pairing code is requested of device 130, app 133 provides the TOTP to complete the secure connection.

At no time is any pairing information (connection settings or pair code) displayed by app 133 on device 130, such that it is not viewable or obtainable by the user. Both the discovery/connection settings and the pairing code (TOTP) are time-based to work for a current or an agreed to time window. This ensures that terminal 120 only permits pairing advertisements to be processed for a given time window and will only accept and permit connections for the given time window. All other wireless connection advertisements are ignored and unprocessed by connection manager 123.

Furthermore, both the discovery/connection settings and the pairing code are obtained by mobile device 130 through an out-of-band means (either from a display of terminal 120 (which indicates device 130 is at or in close proximity to terminal 120 otherwise there would be no ability to obtain the QR code) or from server 110). That is, the conventional device-to-device negotiation for purposes of obtaining the discovery/connection settings and pairing code is not processed or is bypassed and that information is obtained through out-of-band (OOB) communications, which are out-of-band to the device-to-device wireless connection interactions.

Furthermore, because the discovery/connection settings are regularly being changed for each new time window with the TOTP (pairing code), DoS are protected against because connection manager 123 only recognizes wireless connection advertisements that match the current discovery/connection settings expected by connection manager 123 for the current time window.

Second Secure Connection Embodiment

The second connection embodiment expands on security associated with the first secure connection embodiment in the instances where the app 133 obtains the discovery/connection settings and TOTP from server 110 and not from a QR code displayed on the terminal's display.

Here, both the discovery/connection settings and the TOTP are provided to app 133 in a secure and encrypted format for which connection manager 123 is configured to decrypt and validate for secure wireless connections to terminal 120.

A user (such as a customer engineer (CE)) logs into server 110 and authenticates for access to server 110. Using app 133, the user requests a wireless connection to a specific terminal 120 at a specified date and time of day (note that this date and time of day can be in the future and not be a current date and current time of day associated with when the user makes the request through app 133 to server 110).

The request comprises a user identifier (ID—this may be obtained for the user based on the authenticated log in to server 110, such that user does not provide the user ID with the request explicitly), a terminal identifier for terminal 120, a start date and time that the wireless session is being requested for by the user, a time duration that the authorization for access is to be valid for once the user connects device 130 to terminal 120, and a purpose of the wireless session with terminal 120 (e.g., what types of functions or operations are going to be needed during the session, diagnostic functions, service functions, etc.).

Authentication manager 114 processes the information of the request as follows. Manager 114 uses the terminal identifier for terminal 120 to locate shared secret 116 (specific to terminal 120). The shared secret is bound to the user ID, the duration, and the purpose by XORing the bits associated with the user ID, the duration, and the purpose together. A discovery passcode (discovery/connection settings) is then computed following the XORing using results of the XORing and the start date and time. Results of the XORing (bound shared secret 116) is then further modified by XORing the bound shared secret 116 with the computed discovery passcode creating a twice modified version of the shared secret 116. The connection passcode (pairing code) is then generated by processing the twice modified shared secret 116 and the start time for the session producing an authorization code, which code distributor 115 provides to app 133.

In an embodiment, a format of the authorization code may be represented as IIIITPDDDDCCCC, where IIII is the user ID (note this may be omitted from the authorization code and the user may be required to provide it through app 133 as added security), T is the duration, P is the purpose, DDDD is the computed discovery passcode (discovery connection settings), and CCCC is the computed pairing code (TOTP).

Once the user arrives at terminal 120 and within a wireless radio range of the wireless transceiver of terminal 120, app 133 is initiated and the user enters the authorization code (user may have to provide his/her user ID as a prefix to the authorization code when the authorization code lacked the user ID as an added security measure).

App 133 broadcasts a wireless connection advertisement, using the wireless transceiver of device 130. The wireless connection advertisement comprises the user ID, followed by the duration, the purpose, and the discovery passcode (e.g., IIIITPDDDD).

Connection manager 123 is continually performing passive scans of wireless connection advertisements having a format of IIIITPDDDD. Any advertisement matching this format, causes connection manager 123 to perform the following processing.

Connection manager 123 binds (XORs) the user ID (IIII), the duration (T), the purpose (P), and shared secret 124 together producing a first value. The first value and a current date and time are processed by connection manager's TOTP algorithm producing a second value. The second value is compared against the discovery passcode (DDDD) provided in the wireless connection advertisement sent by app 133. If a match occurs, then initial pairing and exchanging of device information for the session are commenced. Note that duration (T) can be used as an offset to the current time to extend the time window that the advertisement is valid.

If the computed discovery passcode (second value) does not match the discovery passcode (DDDD) of the wireless advertisement, then connection manager 123 ignores the advertisement as being tampered with or as being outside the authorized time window for the session.

Assuming, the second value (computed discovery passcode) matches the advertised discovery passcode (DDDD), connection manager 123 connects to the device address that originated the wireless connection advertisement, i.e., device 130.

The terminal 120 and device 130 then exchange information required to establish the wireless session. The information exchanged is dependent on the wireless technology being used for the wireless connection. For example, for Wi-Fi Direct® this may include the Service Set Identifiers (SSIDs) of device 130 and terminal 120; for Bluetooth® Classic, the Bluetooth® Classic device addresses of device 130 and terminal 120; etc.

Once this is done, the connection pass code (pairing code, TOTP, CCCC) is used as the basis for securing the agreed connection and session. For Bluetooth®, this is referred to as the pairing pass code; for Wi-Fi this may be referred to as a Wi-Fi Protected Access (WPA) password. This connection pass code is used as a basis for device 130 and terminal 120 to derive an initial symmetric session key with custom encryption for communications between device 130 and terminal 120 during the connected session.

App 133 provides the TOTP as the connection passcode (CCCC) to connection manager 123. Manager 123 performs the following processing to validate, authenticate, and verify device 130 for a connected session with terminal 120.

Manager 123 binds (XORs) the user ID (IIII), duration (T), Purpose (P), and shared secret 124 together producing a third value. Manager 123 processes its TOTP algorithm with the third value and a time that the discover passcode (DDDD) was verified producing a fourth value. The fourth value is XORed with the computed discover passcode (DDDD) producing a fifth value. Manager 123 processes its TOTP algorithm with the fifth value and a time that the discover passcode (DDDD) was verified producing a sixth value.

When the sixth value matches the provided connection passcode (CCCC), manager 123 permits the session between device 130 and 120 to proceed with the agreed session keys and custom encryption.

It is to be noted that mobile device 130 and app 133 are never given access to any secret data (only server 110 and terminal 120 have knowledge can control of shared secret 116 and shared secret 124). A session can only be established based on dates and time of day maintained by synchronized clocks of server 110 and 120. So, device 130 cannot attempt to alter time windows in the hopes of gaining wireless access to terminal 120. The connection passcode (TOTP or CCCC) is never broadcast with the advertisement from device 130, so it cannot be intercepted. Further, the connection passcode is bound to the advertised discovery information, such that tampering within any of the fields will result in connection manager 123 computing mismatching connection passcodes and prevent the session from being established between device 130 and terminal 120. Also, the discovery passcode (DDDD) is bound to the original data used to create it (make when the user made an authenticated request for access through app 133), such that tampering within any of the fields will result in the connection manager 123 computing mismatching discovery passcodes and prevent the initial connection for exchange of information between device 130 and terminal 120. In fact, only if all the data is completely untampered with will the connection passcode computed by connection manager 123 match a provided and pre-established connection passcode and will connection manager 123 authorized a connected wireless session between device 130 and terminal 120.

Once an authorized session is established between device 130 and terminal 120, connection manager 123 uses the purpose (P) from the advertisement to determine the authorized access level of the user during the session (access level is defined by the purpose).

In an embodiment, connection manager 123 maintains an audit log for the session using the user ID (IIII), so operations and actions performed on terminal 120 are traceable back to the user for the session.

As is not apparent, system 100 permits a wireless communication session with a terminal 120 to be valid only for a specified time-period (time window). The authorization for the session is achieved at a time without involvement of terminal 120; terminal 120 only independently authenticates that a session is legitimate and was prior authorized without any assistance from server 110. Additionally, at the time of actual session access, authorization is confirmed by terminal 120 without any involvement of server 110 being required at the time of access.

In an embodiment, the transceivers of terminal 120 can remain largely dormant when there are no active sessions on terminal 120, which reduces the amount of radio spectrum usage when no connection is required; limits wireless attack vectors; terminal 120 can passively scan for advertisements without revealing itself as a connectable device to other wireless devices on the radio frequency; terminal 120 always makes initial connections to devices 130 and only when a valid wireless advertisement is detected (in a predefined format as discussed above); and it is not possible to "camp" at terminal 120 to break in when the terminal 120 has disabled its wireless transceivers (such as when there is no passive scan for valid wireless advertisements).

In an embodiment, server 130 may, in some embodiments, communicate with terminal 120, over connection 140 for purposes of establishing shared secret 116 as shared secret 124 on terminal 120 and/or for purposes of synchronizing time clocks between server 110 and terminal 120.

In an embodiment, there is no connection or no network connectivity capabilities between server 110 and terminal 120 once the time clocks are synchronized and the shared secret/TOTP algorithm is established. In an embodiment, the shared secret and the common TOTP algorithm is configured on terminal 120 without any network connection between server 110 and terminal 120. In an embodiment, the time clocks are synchronized without any network connection or network connectivity between server 110 and terminal 120.

Interactions between mobile device 130 and server 110 occur over connections 150, which may be wired, wireless, or a combination of wired and wireless.

Once a wireless connection 160 is established between terminal 120 and device 130 is authorized by manager 123 an authenticated wireless session commences between software resources (Application Programming Interfaces (APIs), software modules) and/or interfaces on device 130 and terminal 120, the session is constrained by purpose (P) or constrained by predefined access rights for a designated type of user (such as a customer).

In an embodiment, terminal 120 is an ATM, a Self-Service Terminal (SST), a Point-Of-Sale (POS) terminal, or a kiosk.

In an embodiment, mobile device 130 is a tablet, a phone, a laptop, or a wearable processing device.

In an embodiment, terminal 120 implements a Bluetooth® Low Energy (BLE) Generic Attribute Profile (GATT) client and mobile device 130 implements a GATT server during with wireless connection processing and establishment of an authorized wireless communication session with one another.

In an embodiment, the wireless transceivers of device 130 and terminal 120 implement Bluetooth®, Wi-Fi Direct®, BLE, Near Field Communication (NFC), or any Radio Frequency (RF) wireless technology.

The above-noted embodiments and other embodiments are now discussed with reference to FIGS. 2-3.

Figure 2:
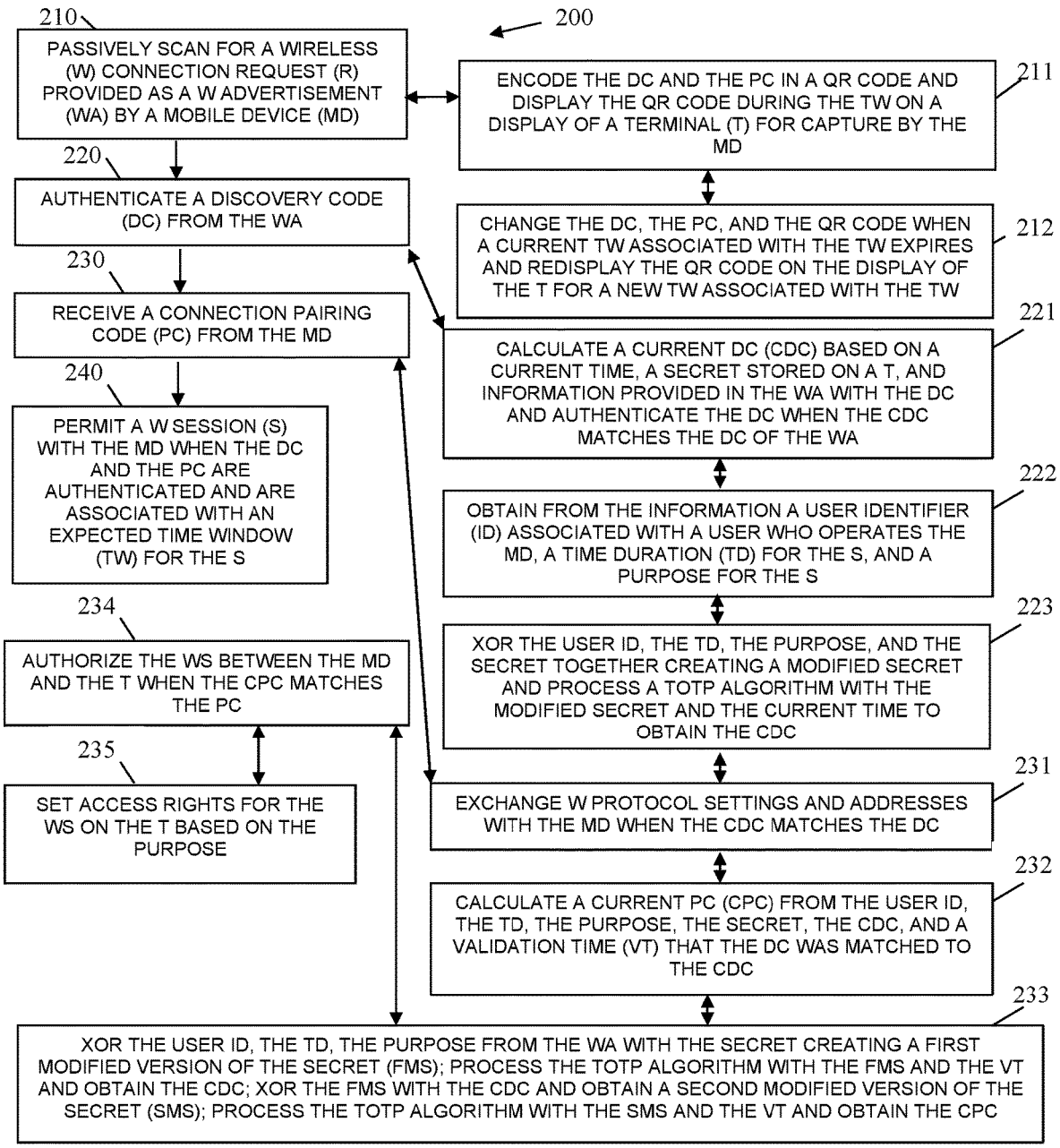
FIG. 2 is a diagram of a method for secure wireless discovery and pairing, according to an example embodiment.

FIG. 2 is a diagram of a method 200 for secure wireless discovery and pairing between two devices, according to an example embodiment. The software module(s) that implements the method 200 is referred to as a "terminal wireless session authenticator." The terminal wireless session authenticator is implemented as executable instructions programmed and residing within memory and/or a non-transitory computer-readable (processor-readable) storage medium and executed by one or more processors of a device or set of devices. The processor(s) of the device(s) that executes the terminal wireless session authenticator are specifically configured and programmed to process the terminal wireless session authenticator. The terminal wireless session authenticator may have access to one or more network connections during its processing. The network connections can be wired, wireless, or a combination of wired and wireless.

In an embodiment, the terminal wireless session authenticator executes on terminal 120. In an embodiment, the terminal 120 is one of an ATM, an SST, a POS terminal, or a kiosk.

In an embodiment, the terminal wireless session authenticator is connection manager 123.

At 210, terminal wireless session authenticator passively scans for a wireless connection request provided as a wireless advertisement by a mobile device seeking a wireless connection to the terminal that processes the terminal wireless session authenticator.

In an embodiment, at 211, the terminal wireless session authenticator encodes the discovery code (discussed below at 220) and the pairing code (discussed below at 230) into a QR code and displays the QR code during an expected time window during which the discovery code and pairing code are valid on a display of the terminal for capture by the mobile device.

In an embodiment of 211 and at 212, the terminal wireless session authenticator changes the discovery code, the pairing code, and the QR code when a current time window associated with the expected time window expires. The terminal wireless session authenticator redisplays the QR code with the changed discovery code and pairing code on the display of the terminal for a new expected time window associated with the expected time window.

At 220, the terminal wireless session authenticator authenticates the discovery code from the wireless advertisement.

In an embodiment, at 221, the terminal wireless session authenticator calculates a current discovery code based on a current time, a secret stored on the terminal, and information provided in the wireless advertisement with the discovery code. The terminal wireless session authenticator authenticates the discovery code when the current calculated discovery code matches the discovery code provided by the mobile device in the wireless advertisement.

In an embodiment of 221 and at 222, the terminal wireless session authenticator obtains from the information a user identifier associated with a user who operates the mobile device, a time duration a wireless session between the mobile device and the terminal, and a purpose for the wireless session.

In an embodiment of 222 and at 223, the terminal wireless session authenticator XORs the user identifier, the time duration, the purpose, and the secret together creating a modified secret. The terminal wireless session authenticator processes a TOTP algorithm with the modified version of the secret and the current time to obtain the current discovery code.

At 230, the terminal wireless session authenticator receives a connection pairing code from the mobile device.

In an embodiment of 223 and 230, at 231, the terminal wireless session exchanges wireless protocol settings and addresses with the mobile device when the current discovery code equals the discovery code provided in the wireless advertisement.

In an embodiment of 231 and at 232, the terminal wireless session authenticator calculates a current connection pairing code from the user identifier, the time duration, the purpose, the secret, the current discovery code, and a validation time that the discovery code was matched with the current discovery code.

In an embodiment of 232 and at 233, the terminal wireless session authenticator XORs the user identifier, the time duration, the purpose from the wireless advertisement with the secret creating a first modified version of the secret. The terminal wireless session authenticator processes the TOTP algorithm with the first modified version of the secret and the validation time to obtain the current discovery code. Next, the terminal wireless session authenticator XORs the first modified version of the secret with the current discovery code and obtains a second modified version of the secret. Finally, the terminal wireless session authenticator processes the TOTP algorithm with the second modified version of the secret and the validation time and obtains the current connection pairing code.

In an embodiment of 233 and at 234, the terminal wireless session authenticator authorizes the wireless session between the mobile device and the terminal when the current connection pairing code matches the mobile device provided connection pairing code.

In an embodiment of 234 and at 235, the terminal wireless session authenticator sets access rights for the wireless session on the terminal based on the purpose provided in the initial wireless advertisement by the mobile device.

At 240, the terminal wireless session authenticator permits the wireless session with the mobile device when the discovery code and the connection pairing code are authenticated and are associated with an expected time window for the wireless session.

It is to be noted that terminal wireless session authenticator provides an on terminal service to authenticate mobile device connections based on information pre-acquired by the user from server 110 or based on information generated by and encoded in a QR code by terminal wireless session authenticator. There is no interaction or network connectivity required by the terminal with the server to provide the authenticated and secure access. Both the initial protocol exchanging of information and the establishment of the session are authenticated independently by terminal wireless session authenticator. The authentication information is specific to a given time window, a given user, a given start time, a given time duration, and a given purpose for the session.

Figure 3:
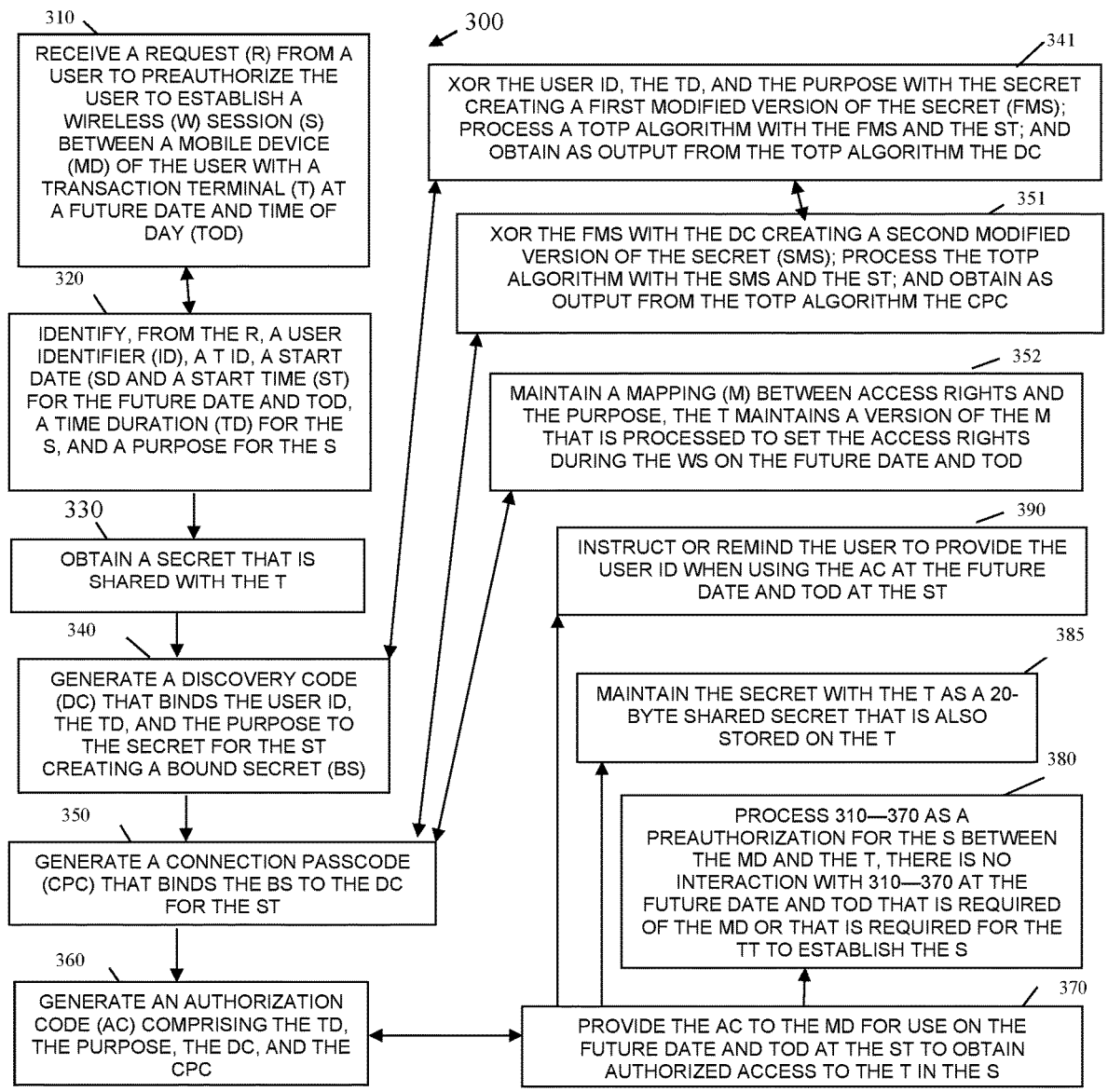
FIG. 3 is a diagram of another method for secure wireless discovery and pairing, according to an example embodiment

FIG. 3 is a diagram of a method 300 for secure wireless discovery and pairing between two devices, according to an example embodiment. The software module(s) that implements the method 300 is referred to as a "terminal wireless connection pre-authorization manager." The terminal wireless connection pre-authorization manager is implemented as executable instructions programmed and residing within memory and/or a non-transitory computer-readable (processor-readable) storage medium and executed by one or more processors of a device or set of devices. The processor(s) of the device that executes the terminal wireless connection pre-authorization manager are specifically configured and programmed to process the terminal wireless connection pre-authorization manager. The terminal wireless connection pre-authorization manager may have access to one or more network connections during its processing. The network connections can be wired, wireless, or a combination of wired and wireless.

In an embodiment, the device that executes the terminal wireless connection pre-authorization manager is server 110. In an embodiment, server 110 is one of multiple servers that cooperate and logically present as a single server associated with a cloud processing environment (cloud 110).

In an embodiment, the terminal wireless connection pre-authorization manager is all of, or some combination of, 113-115.

The terminal wireless connection pre-authorization manager interacts with mobile device 130 in the manners discussed above with system 100 and comprises a shared secret 116 that is shared with terminal 120 as shared secret 124; further the device that executes terminal wireless connection pre-authorization manager maintains a synchronized time clock with terminal 120.

At 310, terminal wireless connection pre-authorization manager receives a request from a user to preauthorize the user to establish a wireless session between a mobile device of the user with a transaction terminal at a future date and time of day.

At 320, the terminal wireless connection pre-authorization manager identifies, from the request, a user identifier, a terminal identifier for the terminal, a start date and a start time for the future date and time of day, a time duration for the wireless session, and a purpose for the wireless session.

At 330, the terminal wireless connection pre-authorization manager obtains a secret that is shared with the transaction terminal.

At 340, the terminal wireless connection pre-authorization manager generates a discovery code that binds the user identifier, the time duration, and the purpose to the secret for the start time creating a bound secret.

In an embodiment, at 341, the terminal wireless connection pre-authorization manager XORs the user identifier, the time duration, and the purpose with the secret creating a first modified version of the secret. The terminal wireless connection pre-authorization manager processes a TOTP algorithm with the first modified version of the secret and the start time and obtains as output from the TOTP algorithm the discovery code.

At 350, the terminal wireless connection pre-authorization manager generates a connection passcode that binds the bound secret to the generated discovery code for the start time.

In an embodiment of 341 and 350, at 351, the terminal wireless connection pre-authorization manager XORs the first modified version of the secret with the discovery code creating a second modified version of the secret. The terminal wireless connection pre-authorization manager processes the TOTP algorithm with the second modified version of the secret and the start time and obtains as output from the TOTP algorithm the connection passcode.

In an embodiment, at 352, the terminal wireless connection pre-authorization manager maintains a mapping between access rights and the purpose. The transaction terminal maintains a version of the mapping that is processed by the terminal to set access rights during the wireless access session on the future date and time of day.

At 360, the terminal wireless connection pre-authorization manager generates an authorization code that comprises the time duration, the purpose, the discovery code, and the connection passcode.

At 370, the terminal wireless connection pre-authorization manager provides the authorization code to the mobile device for use on the future date and time of day at the start time to obtain authorized access to the terminal in the wireless access session.

In an embodiment, at 380, the terminal wireless connection pre-authorization manager is processed as a preauthorization service for the wireless session between the mobile device and the terminal. There is no interaction required from 310-370 by the mobile device at the future date and time of day with server 110 and there is no interaction required from 310-370 by terminal 120 at the future date and time of day with server 110. Server 110 processes the terminal wireless connection pre-authorization manager and provides a pre-authentication of the mobile device for the wireless session at the future date and time of day. Neither terminal 120 nor device 130 require access to server 110 when the wireless session is authenticated by terminal 120 and established on the future date and time of day.

In an embodiment, at 385, the terminal wireless connection pre-authorization manager maintains the shared secret with the terminal as a 20-byte shared secret that is also stored on the transaction terminal 120.

In an embodiment, at 390, the terminal wireless connection pre-authorization manager instructs or reminds the user to provide the user identifier when using the authentication code at the future date and time of data at the start time. That is, the authorization code may not include the user identifier, and app 133 requires the user to enter the user code before broadcasting of the wireless advertisement by the mobile device to the terminal 120. In this case, the user supplied identifier is prepended to the authorization code and the app 133 broadcast the user identifier, the time duration, the purpose, and the discovery code (note the connection passcode is not broadcast by the app 133; rather, it is only provided automatically by app 133 when app 133 detects a request during initial exchanging of wireless protocol information for the pairing passcode and app 133 automatically provides the connection passcode received in the authentication code from terminal wireless connection pre-authorization manager at 360).

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
passively scanning, by a terminal, for a wireless connection request provided as a wireless advertisement by a mobile device, where passively scanning further includes detecting a format of the wireless advertisement that is associated with a portion of an authorization code at a designated date and time and detecting a discovery code in the wireless advertisement;
generating, by the terminal, a current discovery code from information provided in the wireless connection advertisement using a current date and a current time and a stored secret associated with a shared secret that is stored on the terminal;

permitting, by the terminal, an exchange of wireless protocol information between the mobile device and the terminal when the current discovery code matches the discovery code;

receiving, by the terminal, a connection passcode from the mobile device in response to the exchange of the wireless protocol information;

generating, by the terminal, a current connection passcode based on the current discovery code, the current date, the current time, and a modified version of the stored secret;

authenticating, by the terminal, the wireless device to wirelessly connect for a wireless session with the terminal when the current connection passcode matches a connection passcode provided by the mobile device;

permitting, by the terminal, the wireless session between the terminal and the mobile device based on the authenticating for a designated time window on the current date and time; wherein, generating the current discovery code further includes obtaining a user identifier, a time duration for the wireless session and a purpose of the wireless session and binding the user identifier, the time duration, the purpose and the stored secret together creating the modified version of the stored secret and processing the modified version of the stored secret and the current time to obtain the current discovery code.

2. The method of claim 1, wherein passively scanning further includes encoding the discovery code and the connection pairing code in a Quick Response (QR) code and displaying the QR code during the designated time window on a display of the terminal for capture by the mobile device.

3. The method of claim 1, wherein encoding further includes changing the discovery code, the connection pairing code, and the QR code when a current time window associated with the designated time window expires and redisplaying the QR code on the display of the terminal for a new time window associated with the designated time window.

4. The method of claim 1, wherein the obtaining further includes XORing the user identifier, the time duration, the purpose, and the stored secret together creating the modified version of the stored secret and the processing comprising a Time-Based One Time Password (TOTP) algorithm with the modified version of the stored secret and the current time to obtain the current discovery code.

5. The method of claim 4, wherein generating the current connection passcode permitting further includes calculating the current connection passcode from the user identifier, the time duration, the purpose, the modified version of the stored secret, the current discovery code, and a validation time that the discovery code was matched to the current discovery code.

6. The method of claim 5, wherein calculating the current connection passcode further includes:

XORing the user identifier, the time duration, and the purpose from the wireless advertisement with the stored secret creating a first modified version of the stored secret;

processing the TOTP algorithm with the first modified version of the stored secret and the validation time obtaining the current discovery code;

XORing the first modified version of the stored secret with the current discovery code obtaining a second modified version of the stored secret; and processing the TOTP algorithm with the second modified version of the stored secret and the validation time obtaining the current connection passcode.

7. The method of claim 1, wherein authorizing the wireless session further includes setting access rights for the wireless session on the terminal based on the purpose.

8. A method, comprising:

maintaining, by a server, a shared secret with a terminal;

maintaining, by the server, a synchronized time clock with the terminal;

receiving, by the server, a request from a user to preauthorize the user to establish a wireless session between a mobile device of the user with the terminal at a future date and a time of day;

identifying, by the server and from the request, a user identifier for the user, a terminal identifier for the terminal, a start date and a start time for the future date and the time of day, a time duration for the wireless session, and a purpose for the wireless session;

generating, by the server, an authorization code the comprises a discovery code and a connection passcode, generating, by the server, the discovery code by binding the user identifier, the terminal identifier, the time duration, the purpose, and the shared secret together for the start time of the wireless session creating a bound secret, and generating, by the server, the connection passcode by binding the discovery code with a modified version of the shared secret for the start time;

providing, by the server, the authorization code to the mobile device for authenticating to the terminal on the future date and the time of day at the start time and for obtaining authorized access to the terminal in the wireless session.

9. The method of claim 8 further comprising, processing the method as a preauthorization for the wireless session between the mobile device and the terminal, wherein there is no interaction with the method at the future date and the time of day that is required of the mobile device or that is required of the terminal for the terminal to independently authenticate the user and to independently establish the wireless session between the mobile device and the terminal.

10. The method of claim 8 further comprising, maintaining, by the server, the shared secret associated with the terminal as a 20-byte shared secret that is also stored on the terminal.

11. The method of claim 8 further comprising, instructing or reminding, by the server, the user to provide the user identifier for the user when using the authorization code with the terminal at the future date and the time of day at the start time.

12. The method of claim 8, wherein generating the discovery code further includes:

XORing the user identifier, the time duration, and the purpose with the shared secret creating a first modified version of the shared secret;

processing a Time-based One Time Password (TOTP) algorithm with the first modified version of the shared secret and the start time; and obtaining as output from the TOTP algorithm the discovery code.

13. The method of claim 12 wherein generating the connection passcode further includes:

XORing the first modified version of the shared secret with the discovery code creating a second modified version of the shared secret;

processing the TOTP algorithm with the second modified version of the shared secret and the start time; and obtaining as output from the TOTP algorithm the connection passcode.

14. The method of claim 8, wherein generating the authorization code further includes maintaining a mapping between access rights and the purpose, wherein the terminal maintains a version of the mapping that is processed to set the access rights during the wireless session on the future date and the time of day based on the purpose.

15. A system, comprising:
- a server comprising at least one processor and a non-transitory computer-readable storage medium;
- the non-transitory computer-readable storage medium comprises executable instructions;
- a terminal comprising at least one terminal processor and a terminal non-transitory computer-readable storage medium;
- the terminal non-transitory computer-readable medium comprises second executable instructions;
- the executable instructions when executed by the at least one processor from the non-transitory computer-readable storage medium cause the at least one processor to perform operations comprising:
  - maintaining a shared secret with the terminal;
  - maintaining a synchronized time clock with the terminal;
  - preauthorizing a user of a mobile device for an authenticated wireless access session to the terminal at a date and a time in the future;
  - generating an authorization code, wherein the authorization code comprises a discovery code and a connection passcode,
    - wherein the discovery code is generated by binding a user identifier for the user, a terminal identifier for the terminal, a time duration of the authenticated wireless access session, a purpose of the authenticated wireless access session, and the shared secret together for a start time of the authenticated wireless access session;
    - wherein the connection passcode is generated by binding the discovery code with a modified version of the secret for the start time; and
  - providing the authorization code to the mobile device for authenticating to the terminal at the date and the time in the future for the authenticated wireless access session;
- the second executable instructions when executed by the at least one terminal processor from the terminal non-transitory computer-readable storage medium cause the at least one terminal processor to perform second operations comprising:
  - detecting a wireless connection advertisement from the mobile device in a format associated with a portion of the authorization code on the date and the time, wherein the wireless connection advertisement comprises the discovery code but not the connection passcode;
  - generating a current discovery code from information provided in the wireless connection advertisement using a current date and a current time and a stored secret associated with the shared secret that is stored on the terminal;
  - permitting an exchange of wireless protocol information between the mobile device and the terminal when the current discovery code matches the discovery code;
  - receiving the connection passcode from the mobile device in response to the exchange of the wireless protocol information;
  - generating a current connection passcode based on the current discovery code, the current date and the current time, and a modified version of the stored secret;
  - permitting the authenticated wireless access session between the mobile device and the terminal when the current connection passcode matches the connection passcode provided by the mobile device;
- wherein the second executable instructions independently authenticates the user for connecting to exchange the wireless protocol information and for establishing the authenticated wireless access session without any network interaction with the server being required and without the second executable instructions having anything other than the stored secret prior to receiving the wireless connection advertisement and the connection passcode from the mobile device.

16. The system of claim 15, wherein the terminal is an Automated Teller Machine (ATM), a Self-Service Terminal (SST), a Point-Of-Sale (POS) terminal, or a kiosk.

* * * * *